LOAD-CONTROLLED MAGNETIC AMPLIFIER CIRCUIT

Filed March 28, 1957 3 Sheets-Sheet 1

WITNESSES:

Bernard R. Gieguey

Myron E. Click

INVENTORS

Andress Kernick and

Harley A. Perkins, Jr.

BY F. E. Browder

ATTORNEY

Sept. 20, 1960 A. KERNICK ET AL 2,953,740

LOAD-CONTROLLED MAGNETIC AMPLIFIER CIRCUIT

Filed March 28, 1957 3 Sheets-Sheet 2

Sept. 20, 1960 A. KERNICK ET AL 2,953,740

LOAD-CONTROLLED MAGNETIC AMPLIFIER CIRCUIT

Filed March 28, 1957 3 Sheets-Sheet 3

United States Patent Office 2,953,740

Patented Sept. 20, 1960

2,953,740

LOAD-CONTROLLED MAGNETIC AMPLIFIER CIRCUIT

Andress Kernick, East Liberty, and Harley A. Perkins, Jr., Baldwin Township, Allegheny County, Pa., assignors to Westinghouse Electric Corporation, East Pittsburgh, Pa., a corporation of Pennsylvania Filed Mar. 28, 1957, Ser. No. 649,031

12 Claims. (Cl. 323—89)

This invention relates to magnetic amplifier circuits in general and, in particular, to load-controlled magnetic amplifier circuits.

A magnetic amplifier having very small regulation over very large load changes is required for digital control applications such as the operation of contactors, solenoids or motors. The requirements become especially acute where alternating current loads are encountered in digital control applications because of their change in air gap and thus, a consequent change in alternating current impedance. Impedance variations may exceed a ratio of ten to one and normally are at least four to one.

Such a magnetic amplifier must be able to function with contactors, solenoids or motors of standard design. Standard devices of this sort customarily will operate satisfactorily with a supply voltage variation of from 85% to 110% of the rated voltage. With lower voltage, they may not operate. With higher voltage, excessive temperature rises may be incurred with a consequent loss of the useful life of the device.

Assuming a normal variation in line voltage of 90% to 110% of the nominal value, a magnetic amplifier may have only about 5% regulation over the variation in load currents and power factors which result from the above impedance change. Similarly, with other magnetic devices, such as transformers or inductors, and power handling devices such as electronic tubes and transistors, such low regulation is obtained only at the expense of larger size, weight and cost of manufacture. In the case of magnetic amplifiers, this problem has prevented the development of a large market owing to the relatively high cost of magnetic amplifier control.

It is an object of this invention to provide an improved load-controlled magnetic amplifier.

Another object of this invention is to provide a substantially constant-voltage magnetic amplifier for digital control applications.

A further object of this invention is to provide a load-controlled magnetic amplifier with a superior response time over known amplifiers with equivalent power gains.

Other objects of this invention will become apparent from the following description when taken in conjunction with the accompanying drawings. In said drawings, for illustrative purposes only, there are shown some preferred forms of this invention.

Figure 1:
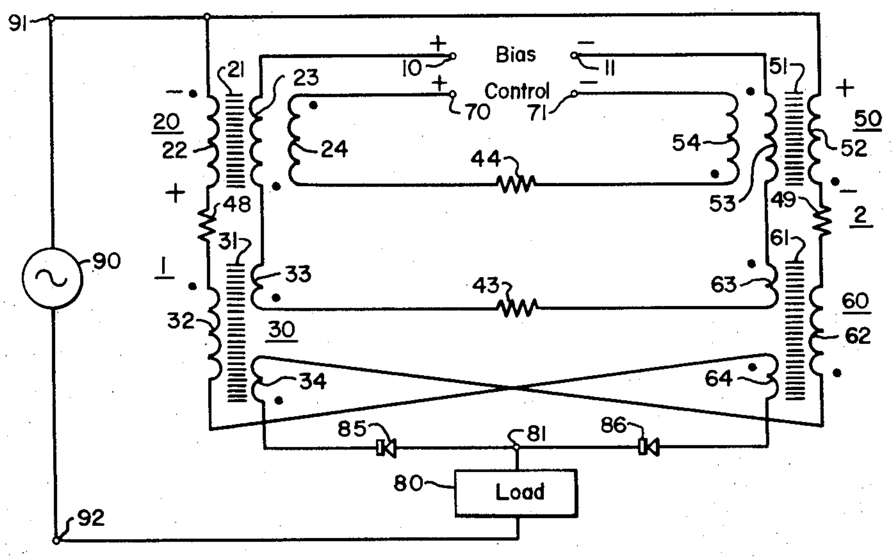
Figure 1 is a schematic diagram illustrating a load-controlled magnetic amplifier embodying the teachings of this invention.

Referring to Figure 1, there is illustrated a load-controlled magnetic amplifier embodying the teachings of this invention. In general, this magnetic amplifier comprises four reactors, two main reactors 20 and 50 and two auxiliary reactors 30 and 60, an alternating current-voltage source 90 and regulating means for determining the amount of saturation of the main and auxiliary reactors including a bias circuit connected to terminals 10, 11 and a control circuit connected to terminals 70, 71.

The main reactor 20 includes a magnetic core member 21, a load winding 22, a bias winding 23 and a control winding 24. The windings 22, 23 and 24 are inductively disposed on the magnetic core member 21. The auxiliary reactor 30 includes a magnetic core member 31, a load winding 32, a bias winding 33 and a feedback winding 34. The windings 32, 33 and 34 are inductively disposed on the magnetic core member 31.

The main reactor 50 includes a magnetic core member 51, a load winding 52, a bias winding 53 and a control winding 54. The windings 52, 53 and 54 are inductively disposed on the magnetic core member 51. The auxiliary reactor 60 includes a magnetic core member 61, a load winding 62, a bias winding 63 and a feedback winding 64. The windings 62, 63 and 64 are inductively disposed on the magnetic core member 61.

The load circuit supplying a load 80 is connected between terminals 91 and 81 in two parallel branches which are designated generally at 1 and 2.

Connected in series circuit relationship in the parallel branch 1 are the load winding 22 of the main reactor 20, a resistance 48, the load winding 32 of the auxiliary reactor 30 and the feedback winding 64 of the auxiliary reactor 60. In the parallel branch 2, connected in series circuit relationship, are the load winding 52 of the main reactor 50, a resistance 49, the load winding 62 of the auxiliary reactor 60, the feedback winding 34 of the auxiliary reactor 30 and a rectifier 85.

The bias circuit includes the bias winding 23 of the main reactor 20, the bias winding 33 of the auxiliary reactor 30, a bias resistor 43, the bias winding 63 of the auxiliary reactor 60 and the bias winding 53 of the main reactor 50 connected in series circuit relationship between the direct current bias source terminals 10 and 11.

The control circuit includes the control winding 24 of the main reactor 20, the control resistor 44 and the control winding 54 of the main reactor 50 connected in series circuit relationship between control terminals 70 and 71. The load 80 is connected to terminals 81 and 92. A suitable alternating current voltage source 90 is connected to terminals 91 and 92.

The operation of this magnetic amplifier circuit may be divided into two portions; the first portion is when the parallel branch 1 including the main reactor 20 and the auxiliary reactor 30 is delivering power to the load 80 through the rectifier 86; the second portion is when the parallel branch 2, including the main reactor 50 and the auxiliary reactor 60 is delivering power to the load 80 through the rectifier 85.

The direct current bias circuit supplies sufficient ampere-turns to reactors 20, 30, 50 and 60 to drive them to or beyond substantially complete negative saturation in the steady state condition. The bias current path with polarity as shown in Figure 1 is as follows. Current flows from terminal 10 through the bias winding 23 of the main reactor 20, the bias winding 33 of the auxiliary reactor 30, the bias resistor 43, the bias winding 63 of the auxiliary reactor 60 and the bias winding 53 of the main reactor 50 to the terminal 11. The bias resistor 43 limits the current flow in the bias circuit to the desired level.

On the first half-cycle of the alternating current voltage source 90 the terminal 91 is at a positive polarity with respect to the terminal 92. Current will flow in the parallel branch 1 from the terminal 91 through the load winding 22 of the main reactor 20, the resistance 48, the load winding 32 of the auxiliary reactor 30, the feedback winding 64 of the auxiliary reactor 60, the rectifier 86 in the forward direction, the terminal 81 and the load 80 to the terminal 92. Resistance 48 represents the total series resistance of parallel branch 1. During this same half-cycle of the alternating current voltage source 90, no current will flow in the parallel branch 2 because of the blocking action of the rectifier 85.

On the second half-cycle of the alternating current voltage source 90, the terminal 92 will be at a positive polarity with respect to the terminal 91. Current will flow in parallel branch 2 from the terminal 92, through the load 80, the terminal 81, the rectifier 85 in the forward direction, the feedback winding 34 of the auxiliary reactor 30, the load winding 62 of the auxiliary reactor 60, the resistance 49 and the load winding 52 of the main reactor 50 to terminal 91. Resistance 49 represents the total series resistance of parallel branch 2. During this second half-cycle of alternating current voltage source 90, no current will flow in the parallel branch 1 because of the blocking action of the rectifier 86.

During the two preceding half-cycles and on succeeding half-cycles, all four reactors will remain unsaturated since the bias windings 23, 33, 53 and 63 have been driving them to substantially complete negative saturation. Therefore, as will be recognized by those familiar with the art, since only the exciting current requirements of the four reactors are needed, no appreciable voltage is dropped across the load 80 as a result of the current flow through the four reactors 20, 30, 50 and 60. This is the "off" condition of the illustrated embodiment of Figure 1.

If a control signal with polarity as shown in Figure 1 is applied to terminals 70 and 71, current will flow from the terminal 70 through the control winding 24 of main reactor 20, the resistor 44 and the control winding 54 of the main reactor 50 to the terminal 71. The resistor 44 limits the current flow in the control circuit to the desired level. This control signal is of sufficient magnitude to overcome the bias ampere-turns on the main reactors 50 and 20 and tends to drive the magnetic core members 21 and 51 to positive saturation by the flux induced therein by the current flow in control windings 24 and 54.

On the first half-cycle of the alternating current voltage source 90, after application of the above described control signal to terminals 70 and 71, current will flow in the parallel branch 1 from the terminal 91, to the terminal 92 in the manner also described above. Since the flux induced by the control signal has overcome the flux induced by the bias signal, the main reactor 20 will be saturated and current will now flow in an appreciable amount in load 80 for some portion of this half-cycle to develop an output voltage across the load 80. The auxiliary reactor 30 is still unsaturated because it has no control windings and is absorbing some portion of this half-cycle of the alternating current voltage.

On the next half-cycle of the alternating current voltage source 90, current will flow in the parallel branch 2 from the terminal 92, to the terminal 91 in the manner described hereinbefore. Again, since the flux induced by the control signal has overcome the flux induced by the bias signal, main reactor 50 will be saturated and there will be an appreciable current flow in the load 80 for some portion of this half-cycle to develop an output voltage. The auxiliary reactor 60 is still unsaturated because it has no control windings and is still absorbing some portion of this half-cycle of the alternating current voltage.

During the two preceding half-cycles and on succeeding half-cycles, the load current flow through feedback winding 34 of the auxiliary reactor 30 and feedback winding 64 of auxiliary reactor 60 will overcome, to an extent controlled by the size of the load, the bias ampere-turns furnished by the bias winding 33 of the auxiliary reactor 30 and the bias winding 63 of the auxiliary reactor 60. The auxiliary reactors 30 and 60 are driven toward positive saturation by an amount depending upon the load requirements and the voltage drop compensation required to maintain the constant amplifier output voltage. For maximum output, all four reactors will become positively saturated in a short time and the alternating current voltage from the source 90 will be reduced only by the saturated impedance of the magnetic amplifier and the conductor resistance to the nominal load voltage. From the initial application of a control signal to terminals 70 and 71 to the closing of the contacts or operation of the load, the load current reaches its maximum during this period of inrush or "unoperated" load condition.

Assuming that the load is a contactor with an alternating current coil, the load current in the "operated" state is about 20% of the maximum current in the "unoperated" state. The magnetic amplifier circuit described above would be so adjusted by means of the bias resistor 43 that after initial application of the control signal, the large "unoperated" load current through the feedback windings 34 and 64 of the auxiliary reactors 30 and 60, respectively, would result in substantially complete positive saturation of these reactors. Thus, the voltage of the alternating current voltage source 90, less the saturated impedance drop of the amplifier, would be applied directly across load 80 at the nominal load voltage.

As the air gap in the contactor closes, the impedance of the load 80 increases with a consequent reduction in load current. This reduction in load current decreases the ampere-turns applied by flow of the load current in feedback windings 34 and 64 so that the auxiliary reactors 30 and 60 are positively saturated for a shorter portion of a power cycle. Consequently, since the auxiliary reactors 30 and 60 again begin to absorb some portion of the alternating current voltage, the voltage dropped across the magnetic amplifier increases sufficiently to hold the voltage drop across load 80 substantially constant. This is the "operated" or holding condition of the illustrated embodiment of Figure 1.

A similar sort of compensating mechanism could be used in a magnetic amplifier of conventional design which employed positive current feedback. But use of positive current feedback at the high slope gain of the magnetic amplifier's transfer characteristic makes stable operation at any point on the steep slope and not near either end of the characteristic extremely difficult. Very small changes in the bias or control currents which would result from temperature changes in the conductors would change the operation of the amplifier very seriously. Also, the extremely critical initial adjustment of the amplifier would be very undesirable. The consequences of maladjustment or drift would be failure to operate the load properly or an eventual burn out of the load conductors. More signal power would be required to insure a fast response or dropout.

This invention overcomes the difficulties discussed in the preceding paragraph. Since the load current is applied as feedback only to the auxiliary reactors 30 and 60 through the feedback windings 34 and 64, respectively, the adjustment and drift problems discussed do not influence the main reactors 20 and 50 at all. The auxiliary reactors 30 and 60 serve to remove the effects of regulation in the main reactors 20 and 50. Adjustment of the auxiliary reactors 30 and 60 is not critical relative to the amplifier performance. The auxiliary reactors 30 and 60 are adjusted so that "unoperated" load current drives them just far enough to hold the voltage drop across load 80 to its rated level of performance. Auxiliary reactors 30 and 60 are designed such that "operated" load current is sufficient to overcome the bias applied to these reactors just enough to hold the output voltage to the nominal operating value.

When the control signal at the terminals 70 and 71 is reduced to zero, the output across the load 80 returns to the initial "off" condition with only exciting current flowing through the load 80 by permitting the bias ampere-turns to regain control of the reactors.

A feature of this invention is observed when used with a load such as coil contactors or solenoids. Assume the load 80 "operated" and the input voltage at the terminals 70 and 71 abruptly reduced to zero. At that time, the main reactors 20 and 50 are operating to positive saturation, but auxiliary reactors 30 and 60 are nearly cut off, as described hereinbefore. Bias current operating through the bias windings 23 and 53 of the main reactors 20 and 50, respectively, is known to induce a voltage in the load windings 22 and 52 in the polarity shown in Figure 1. Just as in any "doubler" type magnetic amplifier, this induced voltage circulates a current around the loop of the parallel branches 1 and 2 in the forward conducting direction for the rectifiers 85 and 86, making reset of the main reactors 20 and 50 to the "off" condition sluggish. Use of high conductance diodes such as silicon or germanium types in the conventional "doubler" type magnetic amplifier for the rectifiers 85 and 86 causes almost prohibitive delay.

In the present invention, the load windings 32 and 62 of the auxiliary reactors 30 and 60 are also in this loop of the parallel branches 1 and 2 and initially near the cut off condition. Current in this loop causes the auxiliary reactors 30 and 60 to move toward positive saturation, but the flux change and the consequent self-induced voltage by the feedback windings 34 and 64 permits the induced voltage from the load windings 22 and 52 of the main reactors 20 and 50 to be opposed without any considerable component of current in the loop due to induced voltage. Thus, the main reactors 20 and 50 are quickly driven towards the "off" condition by the bias current through bias windings 23 and 53 of main reactors 20 and 50, with a consequently quick reduction of voltage across the load 80 to a value less than sufficient to hold it in the "operated" state.

With a power gain and an output equivalent to a conventional "doubler" magnetic amplifier, the response time for cut-off for the present invention has been experimentally observed to be less than half as long as where a five cell per leg selenium rectifier was used on the conventional "doubler" circuit and a single silicon cell was used on the illustrated embodiment of the present invention shown in Figure 1. Use of the same silicon rectifier cells on the conventional "doubler" circuit compared resulted in nearly double the delay. Therefore, almost a four to one reduction in the cut-off response time of the load 80 was effected in this invention with equivalent rectifiers in the place of the rectifiers 85 and 86 shown in Figure 1.

Variation of line voltage, the usual source of alternating current source 90, effects amplifier control, bias and output equally because it is assumed that all derive their supply from the same line voltage. In the "operated" load condition, the positive current feedback to the auxiliary reactors 30 and 60 is of a smaller magnitude than the bias; therefore, a like percent change in bias represents a larger control change than that which occurs by feedback. An inherent ideal regulation exists that tends to maintain constant "operated" condition voltage across the load 80 in spite of line voltage variation. The auxiliary reactors 30 and 60, operating on the linear slope of their input-output transfer characteristic, have the ability to aid the holding at "operated" condition at a reduced line voltage and maintain "operated" load condition by absorbing a greater volt-second area at increased line voltage.

Summarizing in brief, the apparatus illustrated in Figure 1 embodying the teachings of this invention typically has the following characteristics: a flat plus or minus 5% voltage regulation, a half-cycle response to load change, a much faster response to control signal compared to the conventional "doubler," a line-voltage drift not directly reflected in "operated" load current and diversified non-critical control.

The present invention presents several advantages. Although four reactors are used instead of the usual two reactors, the total weight of iron required is substantially less than a magnetic amplifier of conventional design having nearly similar characteristics. With the alternating current "doubler" type connection, the response time for switching the load to the "operated" condition is much improved over an amplifier of conventional design. Diodes, such as silicon diodes, having much higher conductance may be employed profitably without penalizing the response time and also giving a considerable saving in space. Since adjustment of the auxiliary reactors 30 and 60 is not as critical for successful operation, the material requirements for the magnetic core members is not as stringent, making possible the successful use of toroidal cores made of a material such as Hipersil or stacked sheet cores made of a material such as Hipernik.

Segregation of the control of the main reactors 20 and 50 from the open-loop feedback to the auxiliary reactors 30 and 60 makes performance of the common logic functions such as AND, NOT, OR and MEMORY manageable, as well as many other types of diversified control. A two-input AND function results in the present invention where the bias ampere-turns are sufficient to overcome either of two logic inputs to the control terminals 70 and 71, but not both simultaneously. A NOT function version of the circuit may be obtained by reversing the polarity of the bias signal at bias terminals 10 and 11. This would result in an output from the circuit until the output was removed by a negative control signal applied at control terminals 70 and 71. An OR function can be given by either multiple control windings, any one of which is capable of overcoming the bias ampere-turns to produce an output, or by a single control winding that receives input from a diode OR circuit.

Figure 2:
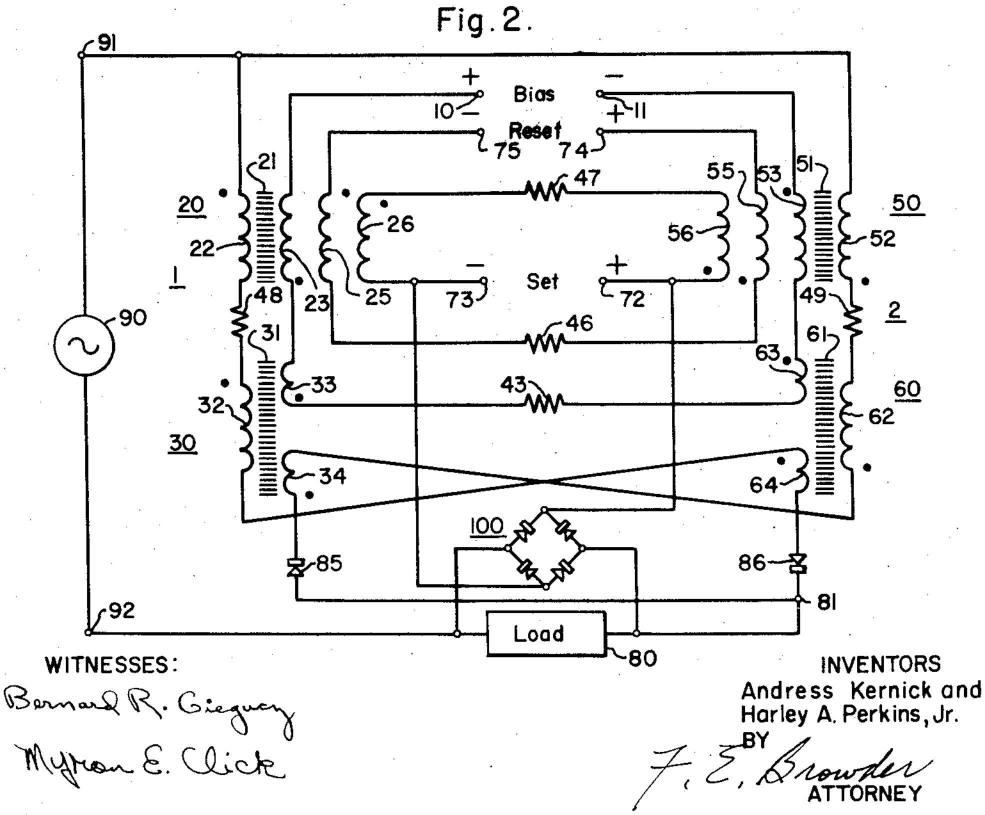
Fig. 2 is a schematic diagram of a second embodiment of the teachings of this invention illustrated in Figure 1.

Referring to Fig. 2, there is illustrated a MEMORY version in a second embodiment of the teachings of this invention in which like components of Figs. 1 and 2 have been given the same reference characteristics. The main distinction between the apparatus illustrated in Figs. 1 and 2 is that in Fig. 2 the control circuit of Figure 1 (comprising control input terminals 10 and 11, the control windings 24 and 43 of the main reactors 20 and 50 and the control resistor 44 has been replaced in Fig. 2 by set and reset circuits.

The set circuit has two portions connected to a pair of set terminals 72 and 73. One portion includes a set winding 56 of the main reactor 50, a set resistor 47 and a set winding 26 of the main reactor 20 connected in series circuit relationship between set terminals 72 and 73. The set windings 56 and 26 are inductively disposed on the magnetic core members 51 and 21 of the main reactors 50 and 20, respectively. The positive voltage-feedback portion of the set circuit is connected from the load terminals 81 and 92, through the full-wave rectifier circuit designated generally at 100, to the set terminals 72 and 73.

The reset circuit includes a reset winding 55 of the main reactor 50, a reset resistor 46 and a reset winding 25 of the main reactor 20 connected in series circuit relationship between the reset terminals 74 and 75. The reset windings 55 and 25 are inductively disposed on the magnetic core members 51 and 21 of the main reactors 50 and 20, respectively.

The operation of the apparatus illustrated in Fig. 2 is the same as the apparatus illustrated in Figure 1 except for the control function as exercised by the set and reset circuits.

With the amplifier operating in the "off" condition, as described hereinbefore, the control signal is applied to the set terminals 72 and 73. Current will flow from the terminal 72, through the control winding 56 of the main reactor 50, the resistor 47 and the set winding 26 of the main reactor 20 to terminal 73. The resistor 47 limits the current flow in the set circuit to the desired level. This control signal is of sufficient magnitude to overcome the bias ampere-turns on main reactors 50 and 20 and tends to drive the magnetic core members 51 and 21 to positive saturation by the flux induced therein by current flow in the set windings 56 and 26.

From this point until the time the load 80 is in the "operated" condition, the operation of the magnetic amplifier is as described hereinbefore. However, upon reaching this "operated" condition, a positive voltage-feedback is being taken from the load terminals 81 and 92 and fed back to the set circuit, through the full-wave rectifier 100. The full-wave rectifier 100 keeps the positive feedback-voltage at the same polarity as the control signal presented to the set terminals 72 and 73. Therefore, the control signal presented to set terminals 72 and 73 may be removed and the positive voltage-feedback from the load will hold the amplifier in the "operated" condition.

The magnetic amplifier will be held in this "operated" condition until a control signal of the polarity shown in Fig. 2 is presented to the reset circuit terminals 74 and 75. Current will flow from the reset terminal 74, through the reset winding 55 of the main reactor 50, the resistor 46 and the reset winding 25 of the main reactor 20 to the terminal 75. This reset control signal is of sufficient magnitude to overcome the ampere-turns on the main reactors 50 and 20 that are furnished by the positive voltage-feedback through the set windings 56 and 26 and tends to drive the magnetic core members 51 and 21 to negative saturation. This allows the bias ampere-turns furnished by the bias windings 53 and 23 of the main reactors 50 and 20 to regain control of the main reactors 50 and 20 and reduce the output across load 80 to the initial value of exciting current in the "off" condition.

In addition to the advantages listed for the embodiment shown in Figure 1, the MEMORY function embodiment shown in Fig. 2 remains very stable with a constant voltage output to any load within 5% to 100% of full load. While remaining stable and delivering output to a randomly drifting load, there is possible a reset with a slight signal, developing high gain either set or reset under adverse, varying load conditions.

Figure 3:
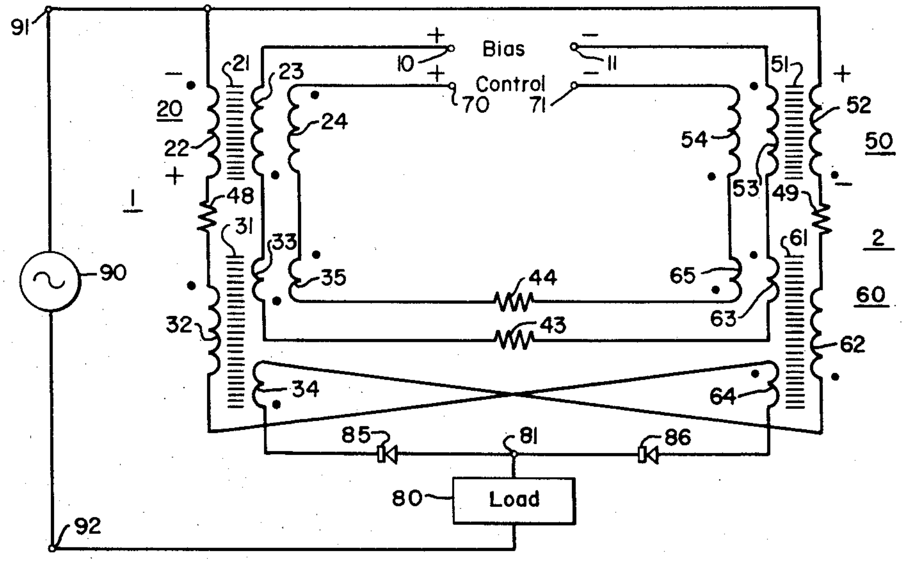
Fig. 3 is a schematic diagram of a third embodiment of the teachings of this invention illustrated in Figure 1.

Referring to Fig. 3, there is illustrated another embodiment of the teachings of this invention in which like components of Figs. 1 and 3 have been given the same reference characters. The main distinction between the apparatus illustrated in Figs. 1 and 3 is that in Fig. 3, additional control windings 35 and 65 have been added to the control circuit connected to terminals 70 and 71. The control circuit now includes control winding 24 of main reactor 20, control winding 25 of auxiliary reactor 30, resistor 44, control winding 65 of auxiliary reactor 60 and control winding 54 of main reactor 50 connected in series circuit relationship between terminals 70 and 71.

The operation of the embodiment illustrated in Fig. 3 is the same as that for the embodiment illustrated in Fig. 1 with the exception that the additional control windings 35 and 65, inductively disposed on magnetic core members 31 and 61, respectively, gives a greater amount of initial control over the auxiliary reactors 30 and 60.

Figure 4:
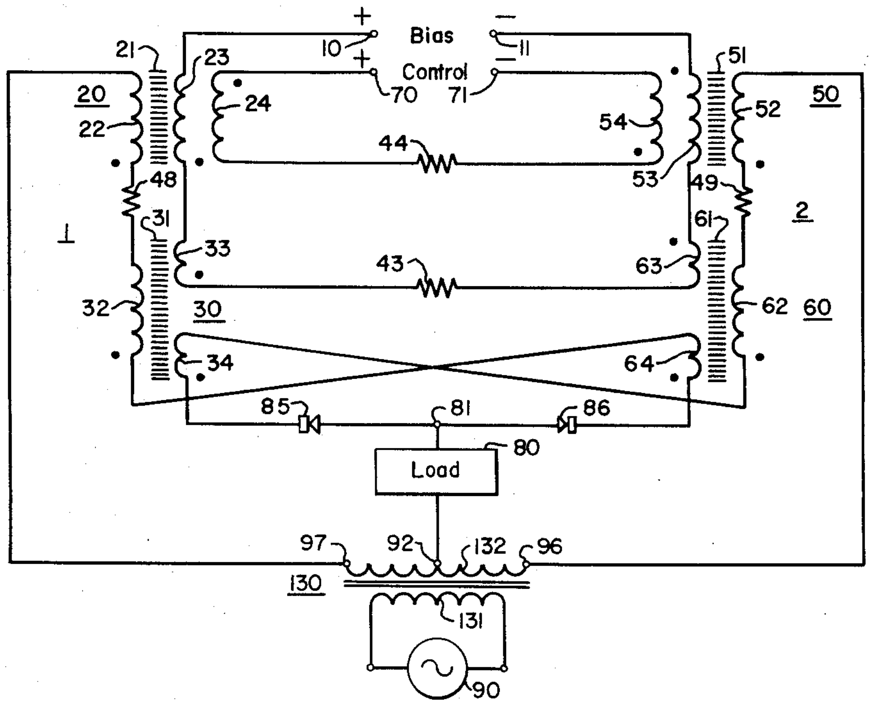
Fig. 4 is a schematic diagram of a fourth embodiment of the teachings of this invention illustrated in Figure 1.

Referring to Fig. 4, there is illustrated a center-tap full wave magnetic amplifier circuit embodying the teachings of this invention, in which like components of Figs. 1 and 4 have been given the same reference characters. The main distinction between the apparatus illustrated in Figs. 1 and 4 is that in Fig. 4 the "doubler" type connection for supplying alternating current-voltage to the magnetic amplifier circuit and the load 80 has been replaced with a secondary winding center-tap supply source. The alternating current-voltage source 90 has been connected to a primary winding 131 of a transformer 130. The load terminal 92 has been connected to the center-tap of a secondary winding 132 of the transformer 130. The parallel branches 1 and 2 are connected to terminals 97 and 96, respectively, of the secondary winding 132.

The operation of this embodiment is the same as the embodiment illustrated in Fig. 1 with the exception that power is supplied to parallel branch 1 when the center-tap terminal 92 is at a positive polarity with respect to the terminal 97. On this same half-cycle the terminal 96 is at a positive polarity with respect to the center-tap terminal 92 but current flow in the parallel branch 2 is blocked by the rectifier 85.

On the next half-cycle of the alternating current-voltage source 90 the terminal 97 is at a positive polarity with respect to the center-tap terminal 92. Therefore, current flow in the parallel branch 1 is blocked by the rectifier 86. On this same half-cycle the center-tap terminal 92 is at a positive polarity with respect to the terminal 96. Current will then flow in the parallel branch 2 and supply the load 80.

Figure 5:
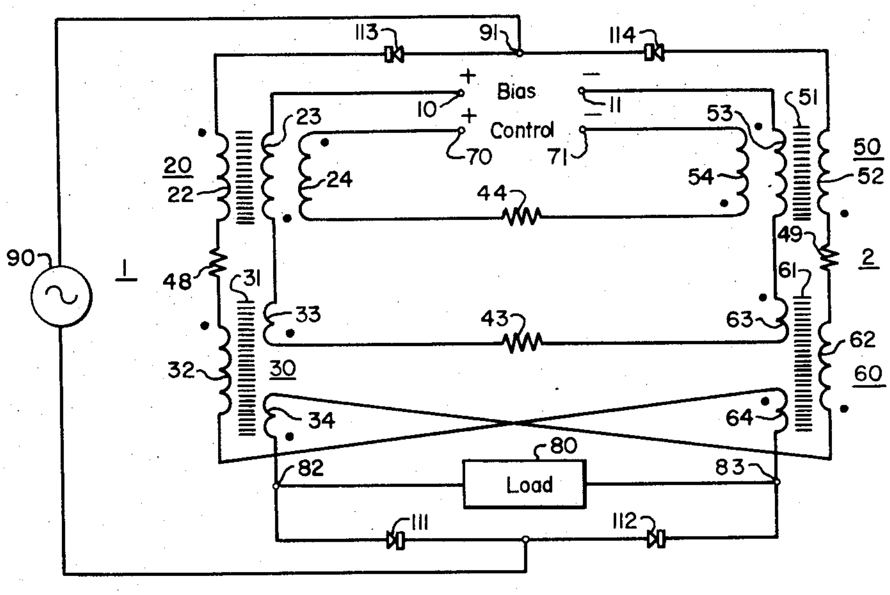
Fig. 5 is a schematic diagram of a fifth embodiment of the teachings of this invention illustrated in Figure 1.

Referring to Fig. 5, there is illustrated a full-wave bridge magnetic amplifier circuit embodying the teachings of this invention, in which like components of Figs. 1 and 5 have been given the same reference characters. The main distinction between the apparatus illustrated in Figs. 1 and 5 is that in Fig. 5 the "doubler" type connection of Fig. 1 has been replaced by a full-wave bridge type connection for supplying power to the magnetic amplifier circuit and the load 80.

In the parallel branch 1 a rectifier 113 has been connected between the terminal 91 and the load winding 22 of main reactor 20. In the parallel branch 2 a rectifier 114 has been connected between the terminal 91 and the load winding 52 of the main reactor 50. The load 80 has been connected between the terminals 82 and 83 of the feedback winding 34 of auxiliary reactor 30 and the feedback winding 64 of the auxiliary reactor 60, respectively. A rectifier 111 has been connected in a forward conducting direction from the terminal 82 to the terminal 92. A rectifier 112 has been connected in a forward conducting direction from the terminal 92 to the terminal 83.

The operation of the magnetic amplifier shown in Fig. 5 is the same as for that embodiment shown in Fig. 1 except that the full-wave bridge type connection gives a direct current output to the load 80; that is, current flow through the load 80 is always from the terminal 83 to the terminal 82.

On the first half-cycle of the alternating current-voltage source 90 when the terminal 91 is at a positive polarity with respect to the terminal 92 current will flow in the parallel branch 1 to terminal 83, through the load 80, the terminal 82 and the rectifier 111 to terminal 92.

On the next half-cycle of the alternating current-voltage source 90 when terminal 92 is at a positive polarity with respect to terminal 91, current will flow from the terminal 92 through the rectifier 112, the terminal 83, the load 80, the terminal 82, the parallel branch 2 and through the rectifier 114 to the terminal 91.

Figure 6:
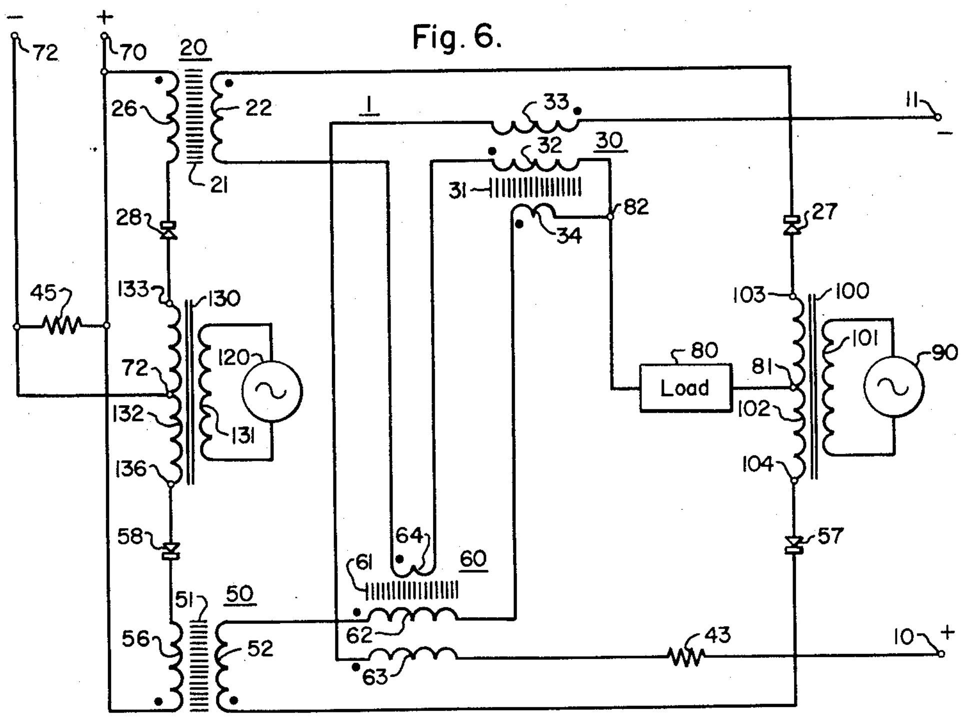
Fig. 6 is a schematic diagram of a sixth embodiment of the teachings of this invention illustrated in Figure 1.

Referring to Fig. 6, there is illustrated another full-wave magnetic amplifier circuit embodying the teachings of this invention.

In general, this embodiment comprises four reactors, two main reactors 20 and 50 and two auxiliary reactors 30 and 60, an alternating current-voltage source 90 and regulating means for determining the amount of saturation of the main and auxiliary reactors.

The main reactor 20 includes a magnetic core member 21, a load winding 22 and a reset winding 26. The windings 22 and 26 are inductively disposed on the magnetic core member 21. The auxiliary reactor 30 includes a magnetic core member 31, a load winding 32, a bias winding 33 and a feedback winding 34. The windings 32, 33 and 34 are inductively disposed on the magnetic core member 31.

The main reactor 50 includes a magnetic core member 51, a load winding 52 and a reset winding 56. The windings 52 and 56 are inductively disposed on the magnetic core member 51. The auxiliary reactor 60 includes a magnetic core member 61, a load winding 62, a bias winding 63 and a feedback winding 64. The windings 62, 63, and 64 are inductively disposed on the magnetic core member 61.

The alternating current-voltage source 90 is connected to a primary winding 101 of a supply transformer 100. A load circuit supplying a load 80 is connected to a secondary winding 102 of the supply transformer 100. The load circuit comprises two parallel branches, designated generally at 1 and 2, connected between a center-tap terminal 81 of the secondary winding 102 and a terminal 82.

Connected in series circuit relationship in the parallel branch 1 are one-half of the secondary winding 102 of the supply transformer 100, a rectifier 27, the load winding 22 of the main reactor 20, the feedback winding 64 of the auxiliary reactor 60 and the load winding 32 of the auxiliary reactor 30. Connected in series circuit relationship in the parallel branch 2 are one-half of the secondary winding 102 of the supply transformer 100, a rectifier 57, the load winding 52 of the main reactor 50, the load winding 62 of the auxiliary reactor 60 and the feedback winding 34 of the auxiliary reactor 30.

The regulating means for determining the amount of saturation of the main and auxiliary reactors include a bias circuit and a reset circuit. The bias circuit includes a resistor 43, the bias winding 63 of the auxiliary reactor 60 and the bias winding 33 of the auxiliary reactor 30 connected in series circuit relationship between the direct current bias source terminals 10 and 11.

The reset circuit for the main reactors 20 and 50 is connected to a secondary winding 132 of a reset supply transformer 130. An alternating current-voltage source 120 of the same frequency as the alternating current-voltage source 90 is connected to a primary winding 131 of the reset supply transformer 130. The reset circuit for the main reactor 20 is connected between a terminal 133 and a center-tap 72 of the secondary winding 132 of the supply transformer 130 and includes a rectifier 28, the reset winding 26 of the main reactor 20 and a resistor 45 connected in series circuit relationship. The reset circuit for the main reactor 50 is connected between a terminal 136 and the center-tap 72 of the secondary winding 132 of the supply transformer 130 and includes a rectifier 58, the reset winding 56 of the main reactor 50 and the resistor 45 connected in series circuit relationship.

The operation of this magnetic amplifier circuit may be divided into two portions; first when the parallel branch 1 including the main reactor 20 and the auxiliary reactor 30 is delivering power to the load 80 through the rectifier 27; and second when the parallel branch 2 including the main reactor 50 and the auxiliary reactor 60 is delivering power to the load 80 through the rectifier 57.

The direct current bias circuit supplies sufficient ampere-turns to the auxiliary reactors 30 and 60 to drive them to or beyond substantially complete negative saturation in the steady-state condition. The bias current, with polarity as shown in Fig. 6, flows from the terminal 10 through the resistor 43, the bias winding 63 of the auxiliary reactor 60 and the bias winding 33 of the auxiliary reactor 30. The resistor 43 serves to limit the current in the bias circuit.

On the first half-cycle of the alternating voltage source 90, the terminal 103 of the secondary winding 102 of the supply transformer 100 is at a positive polarity with respect to the terminal 81. Current will flow in the parallel branch 1 in the forward conducting direction of the rectifier 27 to the load terminal 82. Current will not flow in the parallel branch 2 because of the blocking action of the rectifier 57.

On this same half-cycle the terminal 136 of the secondary winding 132 of the transformer 130 will be at a positive polarity with respect to the center-tap terminal 72 and current will flow through the rectifier 58, the reset winding 56 of the main reactor 50 and the resistor 45. Sufficient ampere-turns will be supplied to drive the main reactor 50 to or beyond substantially complete negative saturation. Current will not flow in the reset winding 26 of the main reactor 20 on this half-cycle because of the blocking action of the rectifier 28.

On the second half-cycle of the alternating voltage source 90 the terminal 104 of the secondary winding 102 of the supply transformer 100 will be at a positive polarity with respect to the terminal 81. Current will flow in the parallel branch 2 in the forward conducting direction of the rectifier 57 to the load terminal 82. Current will not flow in parallel branch 1 because of the blocking action of rectifier 27.

On this same half-cycle the terminal 133 of the secondary winding 132 of the transformer 130 will be at a positive polarity with respect to the center-tap terminal 72 and current will flow through the rectifier 28, the reset winding 26 of the main reactor 20 and the resistor 45. Sufficient ampere-turns will be supplied to drive the main reactor 20 to or beyond substantially complete negative saturation. Current will not flow in the reset winding 56 of the main reactor 50 on this half-cycle because of the blocking action of the rectifier 58.

During the preceding half-cycle and on succeeding half-cycles all four reactors will remain unsaturated since the bias windings 33 and 63 of the auxiliary reactors 30 and 60 have been driving the auxiliary reactors to substantially complete negative saturation, and the reset windings 26 and 56 of the main reactors 20 and 50 have been alternately driving the main reactors to substantially complete negative saturation. Therefore, as will be recognized by those familiar with the art, since only the exciting current requirements of the four reactors is needed, no appreciable voltage is dropped across the load 80 as a result of the alternate current flow in the parallel branches 1 and 2 to terminal 82, through the load and back to terminal 81.

As a direct current control signal with polarity as shown in Fig. 6 is applied to the terminals 70 and 71, the reset action for the main reactors 20 and 50 will be blocked at the rectifiers 28 and 58, respectively.

On succeeding half-cycles after application of the control signal to the terminals 70 and 71, the main reactors 20 and 50 will tend to saturate since the resetting action of the reset windings 26 and 56 has been blocked. Thereafter, an output to the load 80 will be developed in the same manner as in the apparatus illustrated in Fig. 1 with the auxiliary reactors 30 and 60 and the feedback windings 34 and 64 of these reactors functioning in the same manner.

Removal of the control signal at terminals 70 and 71 will permit the resetting action to start again, driving the main reactors from substantially complete positive saturation toward substantially complete negative saturation. This will remove the feedback action on the auxiliary reactors 30 and 60 by the feedback windings 34 and 64 and allow the bias ampere-turns to regain control of the auxiliary reactors and return the magnetic amplifier circuit to the "off" condition.

In conclusion, it is pointed out that while the illustrated examples constitute practical embodiments of our invention, we do not limit ourselves to the exact details shown since certain modifications of the same may be varied without departing from the spirit of the invention.

We claim as our invention:

1. In a magnetic amplifier circuit, in combination, a plurality of main saturable magnetic cores, a plurality of auxiliary saturable magnetic cores, a load circuit of two parallel branches adapted to drive said main and said auxiliary saturable magnetic cores toward positive saturation, means for connecting an alternating-current voltage to said load circuit, means for connecting a load to said load circuit, regulating means for determining the amount of saturation of said main and said auxiliary saturable magnetic cores, input means for said regulating means, and a plurality of feedback windings, a respective one of said plurality of feedback windings inductively disposed on a respective one of said plurality of auxiliary saturable magnetic cores, said feedback windings being so connected to the said load circuit that the entire load-current flows through selected feedback windings only and regulates the amount of saturation in the said auxiliary saturable magnetic cores.

2. In a magnetic amplifier circuit, in combination, a plurality of main saturable magnetic cores, a plurality of auxiliary saturable magnetic cores, a load circuit of two parallel branches adapted to drive said main and said auxiliary saturable magnetic cores toward positive saturation, said load circuit including load windings inductively disposed on each of said saturable magnetic cores and rectifier means, means for connecting an alternating-current voltage to said load circuit, means for connecting a load to said load circuit, regulating means for determining the amount of saturation of said main and said auxiliary saturable magnetic cores, input means for said regulating means, and a plurality of feedback windings, a respective one of said plurality of feedback windings inductively disposed on a respective one of said plurality of auxiliary saturable magnetic cores, said feedback windings being so connected to the said load circuit that the entire load-current flows through selected feedback windings only and regulates the amount of saturation in the said auxiliary saturable magnetic cores.

3. In a magnetic amplifier circuit, in combination, a plurality of pairs of saturable magnetic cores, each of said pairs comprising a main saturable magnetic core and an auxiliary saturable magnetic core, a load circuit of two parallel branches adapted to drive said pairs of saturable magnetic cores periodically toward positive saturation, means for connecting an alternating-current voltage to said load circuit, means for connecting a load to said load circuit, regulating means for determining the amount of saturation of said pairs of saturable magnetic cores, input means for said regulating means, and a plurality of feedback windings, a respective one of said feedback windings inductively disposed on a respective one of said auxiliary saturable magnetic cores, said feedback windings being so connected to the said load circuit that the entire load-current flows through selected feedback windings only and regulates the amount of saturation in the said auxiliary saturable magnetic cores.

4. In a magnetic amplifier circuit, in combination, a plurality of pairs of saturable magnetic cores, each of said pairs comprising a main saturable magnetic core and an auxiliary saturable magnetic core, a load circuit of two parallel branches adapted to drive said pairs of saturable magnetic cores periodically toward positive saturation, each of said pairs of saturable magnetic cores operating alternately in said load circuit with another of said pairs of saturable magnetic cores, means for connecting an alternating-current voltage to said load circuit, means for connecting a load to said load circuit, regulating means for determining the amount of saturation of said pairs of saturable magnetic cores, input means for said regulating means, and a plurality of feedback windings, a respective one of said feedback windings inductively disposed on a respective one of said auxiliary saturable magnetic cores, said feedback windings being so connected to the said load circuit that the entire load-current flows through selected feedback windings only and regulates the amount of saturation in the said auxiliary saturable magnetic cores.

5. In a magnetic amplifier circuit, in combination, a plurality of pairs of saturable magnetic cores, each of said pairs comprising a main saturable magnetic core and an auxiliary saturable magnetic core, a load circuit of two parallel branches adapted to drive said pairs of saturable magnetic cores periodically toward positive saturation, said load circuit including load windings inductively disposed on each of said saturable magnetic cores and a rectifier means for each of said pairs of saturable magnetic cores, means for connecting an alternating-current voltage to said load circuit, means for connecting a load to said load circuit, regulating means for determining the amount of saturation of said pairs of saturable magnetic cores, input means for said regulating means, and a plurality of feedback windings, a respective one of said feedback windings inductively disposed on a respective one of said auxiliary saturable magnetic cores, said feedback windings being so connected to the said load circuit that the entire load-current flows through selected feedback windings only and regulates the amount of saturation in the said auxiliary saturable magnetic cores.

6. In a magnetic amplifier circuit, in combination, a plurality of pairs of saturable magnetic cores, each of said pairs comprising a main saturable magnetic core and an auxiliary saturable magnetic core, a load circuit of two parallel branches adapted to drive said pairs of saturable magnetic cores periodically toward positive saturation, means for connecting an alternating-current voltage to said load circuit, means for connecting a load to said load circuit, regulating means for determining the amount of saturation of said pairs of saturable magnetic cores, input means for said regulating means, and a plurality of feedback windings inductively disposed on said auxiliary saturable magnetic cores, said feedback windings being so connected to the said load circuit that the entire load current delivered by the load circuit associated with one of said pairs of saturable magnetic cores will flow in the feedback winding disposed on the auxiliary saturable magnetic core of another of said pairs of saturable magnetic cores thereby regulating the amount of saturation therein.

7. In a magnetic amplifier circuit, in combination, a plurality of main saturable magnetic cores, a plurality of auxiliary saturable magnetic cores, a load circuit adapted to drive said main and said auxiliary saturable magnetic cores toward positive saturation, said load circuit comprising two parallel branches, each of said parallel branches including a load winding of a main saturable magnetic core and a load winding of an auxiliary saturable magnetic core, means for connecting an alternating-current voltage source to said load circuit, means for connecting a load to said load circuit, regulating means for determining the amount of saturation of said main and auxiliary saturable magnetic cores, said regulating means including a bias circuit and a control circuit, said bias circuit including bias windings inductively disposed on each of the said saturable magnetic cores and a current limiting means, said control circuit including control windings inductively disposed on the said main saturable magnetic cores and a current limiting means, and a plurality of feedback windings, a respective one of said plurality of feedback windings inductively disposed on a respective one of said plurality of auxiliary saturable magnetic cores, said feedback windings being so connected to the said load circuit that the entire load current flows through selected feedback windings only and regulates the amount of saturation in the said auxiliary saturable magnetic cores.

8. In a magnetic amplifier circuit, in combination, a plurality of main saturable magnetic cores, a plurality of auxiliary saturable magnetic cores, a load circuit adapted to drive said main and said auxiliary saturable magnetic cores toward positive saturation, said load circuit comprising two parallel branches, each of said parallel branches including a load winding of a main saturable magnetic core and a load winding of an auxiliary saturable magnetic core and rectifier means, means for connecting an alternating-current voltage source to said load circuit, means for connecting a load to said load circuit, regulating means for determining the amount of saturation of said main and auxiliary magnetic cores, said regulating means comprising a bias circuit and a reset circuit and a set circuit, and a plurality of feedback windings so connected to the said load circuit that a load-current flow through the said feedback windings regulates the amount of saturation in the said auxiliary saturable magnetic cores, said set circuit in response to a set signal and in cooperation with means for feeding back load voltage to said set circuit being operative to produce and maintain an output from said magnetic amplifier, said reset circuit in response to a reset signal being operative to remove said output from said magnetic amplifier.

9. In a magnetic amplifier circuit, in combination, a plurality of main saturable magnetic cores, a plurality of auxiliary saturable magnetic cores, a load circuit adapted to drive said main and said auxiliary saturable magnetic cores toward positive saturation, said load circuit comprising two parallel branches, each of said parallel branches including a load winding of a main saturable magnetic core, a load winding comprising an auxiliary saturable magnetic core and rectifier means, means for connecting an alternating-current voltage to said load circuit, means for connecting a load to said load circuit, regulating means for determining the amount of saturation of said main and auxiliary magnetic cores, said regulating means including a bias circuit, a reset circuit and a set circuit, said bias circuit including bias windings inductively disposed on each of said saturable magnetic cores and a current-limiting means, said reset circuit including reset windings inductively disposed on said main saturable magnetic cores and a current limiting means, said set circuit including set windings inductively disposed on said main saturable magnetic cores, a positive voltage-feedback circuit from the said load and current-limiting means, and a plurality of feedback windings inductively disposed on said auxiliary saturable magnetic cores, said feedback windings being so connected to the said load circuit that a load-current flow through said feedback windings regulates the amount of saturation in the said auxiliary saturable magnetic cores, said set circuit in response to a set signal and in cooperation with means for feeding back load voltage to said set circuit being operative to produce and maintain an output from said magnetic amplifier, said reset circuit in response to a reset signal being operative to remove said output from said magnetic amplifier.

10. In a magnetic amplifier circuit, in combination, a plurality of main saturable magnetic cores, a plurality of auxiliary saturable magnetic cores, a load circuit adapted to drive said main and said auxiliary saturable magnetic cores toward positive saturation, said load circuit comprising two parallel branches, each of said parallel branches including a load winding of a main saturable magnetic core and a load winding of an auxiliary saturable magnetic core, rectifier bridge means for connecting a load to said load circuit, means for connecting an alternating-current voltage to said load circuit, regulating means for determining the amount of saturation of said main and auxiliary saturable magnetic cores, said regulating means including a bias circuit and a control circuit, said bias circuit including bias windings inductively disposed on each of the said saturable magnetic cores and current-limiting means, said control circuit including control windings inductively disposed on each of the said main saturable magnetic cores and current-limiting means, and a plurality of feedback windings, a respective one of said plurality of feedback windings inductively disposed on a respective one of said plurality of auxiliary saturable magnetic cores, said feedback windings being so connected to the said load circuit that the entire load-current flows through selected feedback windings only and regulates the amount of saturation in the said auxiliary saturable magnetic cores.

11. In a magnetic amplifier circuit, in combination, a plurality of main saturable magnetic cores, a plurality of auxiliary saturable magnetic cores, a load circuit adapted to drive said main and said auxiliary saturable magnetic cores toward positive saturation, said load circuit comprising two parallel branches, each of said parallel branches including a load winding of a main saturable magnetic core, a load winding of an auxiliary saturable magnetic core and rectifier means, means for connecting a first alternating-current voltage to said load circuit, means for connecting a load to said load circuit, regulating means for determining the amount of saturation of said main and auxiliary saturable magnetic cores, said regulating means including a bias circuit and a reset circuit, said bias circuit including bias windings inductively disposed on each of the said auxiliary saturable magnetic cores and a current-limiting means, said reset circuit including reset windings inductively disposed on said main saturable magnetic cores, a current-limiting means, means for connecting a second alternating-current voltage to said reset circuit, means for applying a blocking signal to block said second alternating voltage from application to said reset circuit and rectifier means, and a plurality of feedback windings inductively disposed on said auxiliary saturable magnetic cores, said feedback windings being so connected to the said load circuit and a load-current flow through said feedback windings regulates the amount of saturation in the said auxiliary saturable magnetic cores.

12. A magnetic amplifier comprising; first and second pairs of saturable magnetic cores; each said pair comprising a main and an auxiliary core; a load circuit for said magnetic amplifier having two parallel branches; each said parallel branch having a load winding inductively disposed on each core of one of said pairs of cores and a feedback winding inductively disposed on said auxiliary core of the other of said pairs of cores connected in series circuit relationship; means connecting a load and a supply voltage to said parallel branches; load current flow through each said parallel branch being operative to maintain a substantially constant voltage output with varying values of said load.

References Cited in the file of this patent

UNITED STATES PATENTS

| | | |
|---|---|---|
| Re. 24,068 | Geyger | Jan. 18, 1955 |
| 2,475,575 | Tweedy | July 5, 1949 |
| 2,509,864 | Hedstrom | May 30, 1950 |
| 2,552,952 | Gachet et al. | May 15, 1951 |
| 2,640,098 | Grillo | May 26, 1953 |
| 2,730,574 | Belsey | Jan. 10, 1956 |
| 2,752,429 | Hanson | June 26, 1956 |
| 2,764,726 | Sanders et al. | Sept. 25, 1956 |
| 2,849,544 | Herz et al. | Aug. 26, 1958 |